United States Patent
Baker

(10) Patent No.: US 11,627,278 B2
(45) Date of Patent: Apr. 11, 2023

(54) HIGH DYNAMIC RANGE VIDEO FORMAT DETECTION

(71) Applicant: Project Giants, LLC, Beaverton, OR (US)

(72) Inventor: Daniel G. Baker, Beaverton, OR (US)

(73) Assignee: PROJECT GIANTS, LLC, Beaverton, OR (US)

( * ) Notice: Subject to any disclaimer, the term of this patent is extended or adjusted under 35 U.S.C. 154(b) by 0 days.

(21) Appl. No.: 16/840,161

(22) Filed: Apr. 3, 2020

(65) Prior Publication Data

US 2020/0322562 A1 Oct. 8, 2020

Related U.S. Application Data

(60) Provisional application No. 62/830,213, filed on Apr. 5, 2019.

(51) Int. Cl.
*H04N 5/44* (2011.01)

(52) U.S. Cl.
CPC .................................. *H04N 5/44* (2013.01)

(58) Field of Classification Search
CPC ........ H04N 7/0115; H04N 5/44; H04N 19/80; H04N 19/50; H04N 19/70; H04N 19/30
See application file for complete search history.

(56) References Cited

U.S. PATENT DOCUMENTS

| | | | | |
|---|---|---|---|---|
| 9,918,041 | B1 * | 3/2018 | Zhang | H04N 7/012 |
| 10,440,318 | B2 * | 10/2019 | Zhang | H04N 7/0137 |
| 10,679,070 | B1 * | 6/2020 | Poutivski | G06K 9/00765 |
| 2008/0002771 | A1 * | 1/2008 | Chen | H04N 19/139 |
| | | | | 375/E7.146 |
| 2009/0034857 | A1 * | 2/2009 | Moriya | H04N 19/46 |
| | | | | 382/238 |
| 2011/0032991 | A1 * | 2/2011 | Sekiguchi | H04N 19/103 |
| | | | | 375/240.16 |
| 2011/0211812 | A1 * | 9/2011 | Tzoukermann | H04N 21/84 |
| | | | | 386/250 |
| 2015/0170389 | A1 | 6/2015 | Ming et al. | |
| 2016/0094803 | A1 * | 3/2016 | Possos | H04N 7/012 |
| | | | | 348/448 |
| 2016/0261793 | A1 * | 9/2016 | Sivan | H04N 19/597 |
| 2017/0337711 | A1 * | 11/2017 | Ratner | H04N 19/176 |

(Continued)

OTHER PUBLICATIONS

Jin et al., "Video fragment format classification using optimized discriminative subspace clustering," Signal Processing Image Communication, Elsevier Science Publishers, Amsterdam, NL, vol. 40, Nov. 10, 2015, pp. 26-35.

(Continued)

*Primary Examiner* — Samira Monshi
(74) *Attorney, Agent, or Firm* — Miller Nash LLP

(57) ABSTRACT

A video format detector receives a video signal in a one of a plurality of possible video formats and produces a detected format. A cumulative distribution function generator generates a cumulative distribution function curve from a component of the video signal and a feature detector generates one or more feature vectors from the cumulative distribution function curve. A video classifier accepts the one or more feature vectors from the feature detector and generates a prediction of the video format in which the video signal was produced based, at least in part, on the received feature vectors.

14 Claims, 5 Drawing Sheets

(56) References Cited

U.S. PATENT DOCUMENTS

| | | | |
|---|---|---|---|
| 2018/0089581 A1 | 3/2018 | Zang et al. | |
| 2018/0295375 A1* | 10/2018 | Ratner | G06T 7/136 |
| 2018/0359416 A1 | 12/2018 | Hold-Geoffroy et al. | |
| 2019/0005324 A1* | 1/2019 | Anisimovskiy | G06K 9/6212 |
| 2019/0272643 A1* | 9/2019 | Gadgil | G06T 9/00 |
| 2020/0320678 A1* | 10/2020 | Baker | G06T 5/007 |

OTHER PUBLICATIONS

PCT International Search Report and Written Opinion of the International Searching Authority issued in International Application No. PCT/US2020/026724, dated Jun. 16, 2020, 15 pages.

* cited by examiner

HIGH DYNAMIC RANGE VIDEO FORMAT DETECTION

PRIORITY

This disclosure claims benefit of U.S. Provisional Application No. 62/830,213, titled "HIGH DYNAMIC RANGE VIDEO FORMAT DETECTION USING MACHINE LEARNING," filed on Apr. 5, 2019, which is incorporated herein by reference in its entirety.

FIELD OF THE INVENTION

This disclosure is directed to systems and methods related to measuring video signals, and more particularly, to automatically detecting a format of a video signal.

BACKGROUND

Televisions have rapidly improved in display size and resolution over the original 1080×1920 high definition (HD) format with the advent of 4K and 8K consumer displays, which can support content from streaming data services with 4K resolution. It can be difficult, however, to perceive and fully appreciate these new high-resolution improvements on typical living room screen sizes at typical viewing distances, making further improvements on image resolution moot.

Instead of improving image resolution, which has diminishing returns, present advancement in video technology has focused on exploiting the wider color gamut (WCG) and, in particular, the much wider contrast and peak brightness High Dynamic Range (HDR) of modern displays. Unlike image resolution improvements, these improvements in HDR create a very noticeable improvement in viewer experience, which can easily be appreciated at typical living room viewing distances and lighting.

Although HDR formats differ from formats of the traditional Standard Dynamic Range (SDR), users of waveform monitors cannot depend solely on metadata to indicate an HDR versus SDR encoding format, since that ancillary metadata may be missing, incorrectly appended, or otherwise missed or misinterpreted. In some instances, viewing the video itself may suggest a particular encoding. Such detection by viewing may be inaccurate, however, since typical video varies with program content—often intentionally failing to utilize the full contrast range available in either an SDR or HDR encoding curve for reasons of artistic intent, for example. Thus, detecting HDR content from SDR content by merely viewing the video luminance signal itself is not only time consuming, but also prone to mistakes in practice.

Embodiments of the disclosure address these and other deficiencies of the prior art.

BRIEF DESCRIPTION OF THE DRAWINGS

Aspects, features and advantages of embodiments of the present disclosure will become apparent from the following description of embodiments in reference to the appended drawings in which.

DESCRIPTION

As mentioned above, advancement in video technology has focused on exploiting the WCG and the wider contrast and peak brightness of HDR in modern displays. The red, green, and blue signals (R', G', and B', respectively) and luminance signal (Y') encoding for new HDR formats differs from the traditional SDR "gamma" power law function, or gamma curve encoding, which has been used since the early days of black and white television to code the higher dynamic range into 8-bit (consumer) and 10-bit (professional) data samples. Some popular HDR encoding defines a perceptual quantization (PQ) curve that optimized the bit utilization to minimize visible steps (seen as contouring lines) in displayed luminance while extending the peak display brightness from SDR's 200 nits to over 10,000 nits. Another type of HDR encoding, called Hybrid Log Gamma (HLG), provides peak display brightness over 1000 nits.

Disclosed herein are systems, devices, and methods having machine learning to classify video content encoding format, such as, but not limited to, PQ HDR, HLG HDR, SDR, or any other encoding format. Embodiments of the disclosure can recognize and determine what type of the many available machine learning approaches, such as, but not limited to, Bayesian, decision tree, support-vector machine (SVM), convolutional neural network (CNN), etc. to use, if any, to learn and classify an encoding format. Embodiments of the disclosure may also generate an efficient and effect set of features to drive a machine learning process both for training and real-time classification, as well as generating a filtering process to mitigate irritating false alarm and false positive indications.

Figure 1:
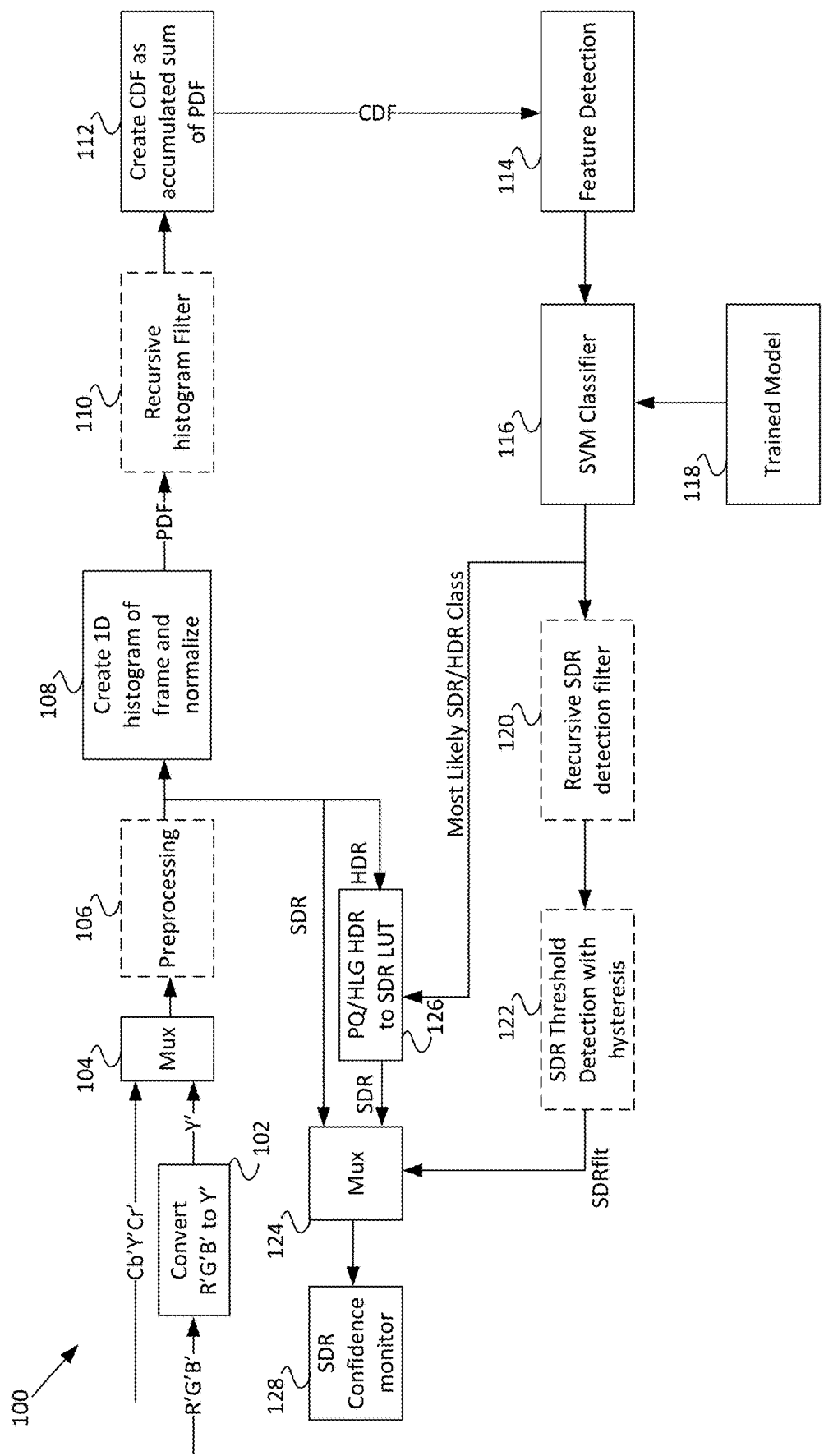
FIG. 1 is a block diagram of a high dynamic range video format detection system according to some embodiments of the disclosure.

FIG. 1 is a block diagram of a high dynamic range video format detection system 100 according to some embodiments of the disclosure. FIG. 1 illustrates, among other things, an embodiment for efficiently and effectively generating a set of features to drive a machine learning process both for training and real time-classification. The system can receive either an R'G'B' input signal or a Cb'Y'Cr' input signal. If an R'G'B' input signal is received, it can be converted to a luminance signal, Y', by a converter 102.

A multiplexer 104 can select which Y' signal from the input signals to select. Optional preprocessing 106 may be performed in some embodiments. The optional preprocessing 106 may include, for example, resizing the input signal to a smaller image format or performing letter-box detection and cropping to an active picture, among many other preprocessing operations.

A probably density function (PDF) 108 can be performed to create a one-dimensional normalized histogram for the frame generating a PDF signal. An optional recursive histogram filter 110 can be applied to the one-dimensional normalized histogram in some embodiments. The recursive histogram filter 110 can mitigate false alarm and false positive indications. This can allow the PDF signal to be recursively updated to allow accumulation (averaging) over many frames without dependence on the contrast curve of just a few frames. The time constant, such as, for example, several seconds, sets the averaging time. The time constant should be fast enough to adapt to scene changes and detect, for example, an SDR commercial in an otherwise HDR video stream.

A cumulative distribution function (u) 112 of the luminance signal value histogram at selected video frames is performed as the video content is input in real-time generating a dynamically changing CDF curve. The dynamically changing CDF curve can be temporarily filtered and sampled at a pre-determined number of image area related sample points, for example, five image area related sample points, to determine a Y' signal level for each. This is possible since the CDF is a monotonically increasing function relating particular pixel image area thresholds to encoded Y' pixel values and, over time, follows the HDR or SDR encoding curve.

Feature detection 114 generates a feature vector based on the pre-determined number of image area related sample points. The feature detection 114 can determine the amount of luminance per image area based on the input code values determined by the CDF. The feature detection can generate a feature vector indicating the pre-determined number of image area related sample points based on the CDF.

The feature vector is sent to a classifier 116. The classifier 116 can be any machine learning device, such as those mentioned above. In the example shown in FIG. 1, the classifier 116 is a Support Vector Machine (SVM) classifier. The classifier 116 may be trained by a trained model 118. The classifier 116 may be trained to classify any number of classes, such as, for example, a 3-class classifier, to classify video between SDR, PQ HDR, and HLG HDR. The feature vectors from the feature detection 114 can be used as an efficient and effective set of features to drive a machine learning process through the classifier 116 both for training and real-time classification.

After classification by the classifier 116, the output may optionally be further filtered in a recursive SDR detection filter 120 and threshold hysteresis 122 to mitigate false detections. If the output of the recursive SDR detection filter 120 violates a threshold, then the determined class is determined to be incorrect. For example, if the class is determined by the classifier 116 to be SDR, but the filtered output of the SDR detection filter 120 is greater than a threshold, such as 0.9, then the original classification is determined to be wrong and the output value is set for HDR. The output value will stay at HDR until the filtered detection output goes below another threshold, such as 0.5. At that point, the output switches to a binary zero, indicating SDR content.

The filtered output of the SDR threshold with hysteresis 122 can be received at multiplexer 124. The output from the preprocessor 106 may be either SDR content or HDR content. The output of the classifier 116 is sent to a look up table 126 or other process to convert the HDR content to SDR based on the class determined by the classifier 116.

The output of the SDR threshold with hysteresis 122, shown as SDRflt in FIG. 1, controls the multiplexer 124 to select either the SDR content or the converted SDR content through the look up table 126. That is, either the content from the preprocessor 404 can be passed through directly to the multiplexer or the converted content can be passed through. For example, if the class output by the classifier 116 is HDR, but the SDR threshold with hysteresis 122 determines it is actually SDR content, then the multiplexer 124 will select the SDR input. Conversely, if the class output by the classifier 116 is SDR, but the threshold with hysteresis 122 determines it is actually HDR content, then the multiplexer 124 will select the converted SDR input through the look up table 126. The output of the multiplexer 124 is sent to an SDR confidence monitor 128 to allow a user to ensure that if HDR content is present that the converted SDR content still looks acceptable.

Figure 2:
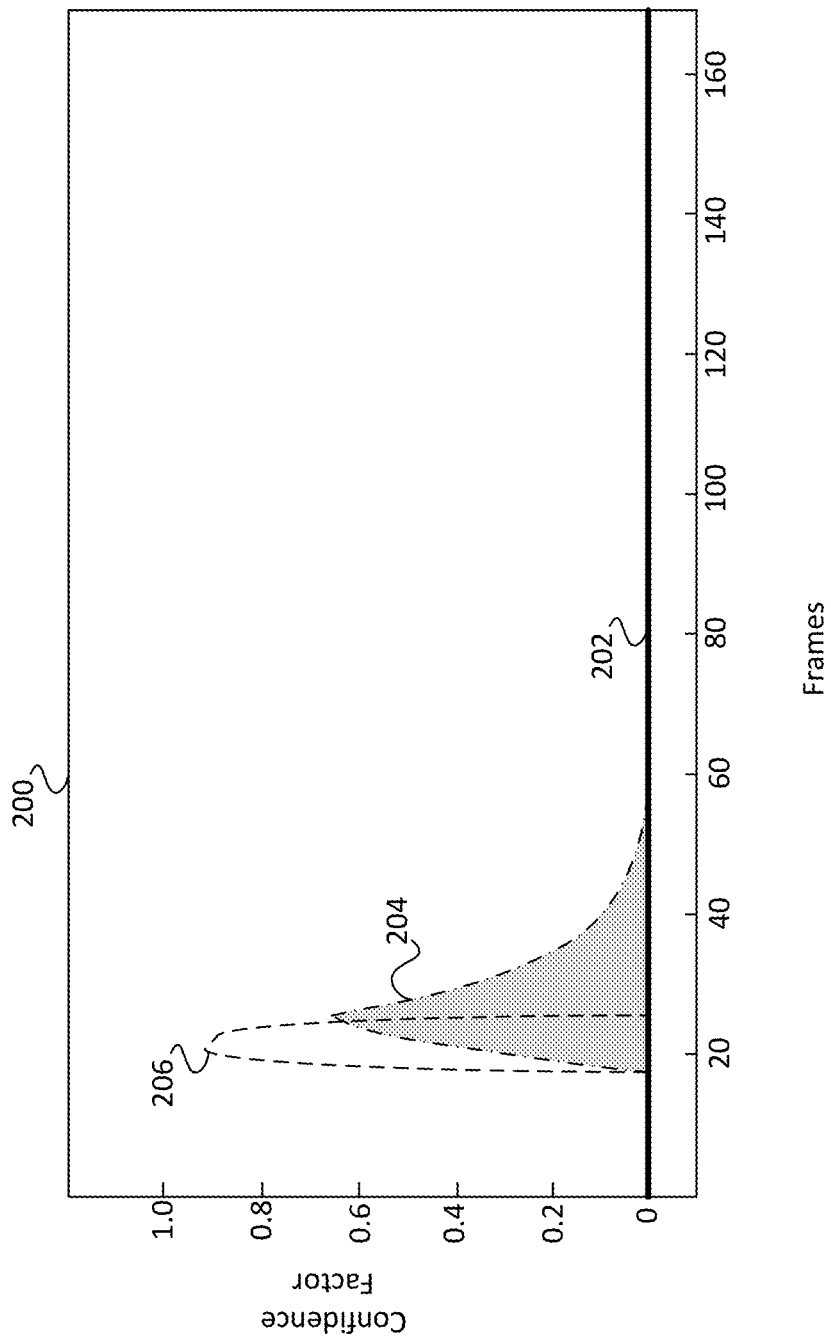
FIG. 2 is a plot illustrating an output of the system of FIG. 1 when an SDR video input is received.

FIG. 2 is a plot 200 illustrating the performance of the system 100 in detecting a known 720P SDR format input video clip. To generate plot 200, a system 100 was implemented with a quadratic binary classifier 116 to detect HDR PQ (class 1) vs SDR (class 0). The horizontal axis of the plot 200 represents the number of measured frames of a video clip, which corresponds to a thirty-three second temporal length of the video clip, while the vertical axis corresponds to the output of the recursive SDR detection filter 120 measured as a confidence factor. The binary result 202 in FIG. 2 illustrates that the system 100 remained at class zero for the duration of the entire video clip, meaning that the system 100 accurately detected 100% of the time that the video clip was in an SDR format.

Trace 204 illustrates the filtered HDR class determined by the system 100 through the recursive SDR detection filter 120. As can be seen in trace 204, the beginning of the video clip includes a short segment of several seconds that mimics HDR formatting sufficiently to mislead the classifier 116. However, the post detection filtering 120 and threshold hysteresis 122 did not exceed the hysteresis threshold for HDR, so the binary detection result did not switch to HDR.

Trace 206 illustrates the confidence factor output by the classifier 116 to indicate the most likely class, which can be referred to as the confidence factor trace 206. The confidence factor trace 206 illustrates the original output of the classifier 116 initially indicates that the video clip was in an HDR format since the confidence exceeded 0.9. Since the threshold was not violated as shown by the filtered class trace 204, however, the binary output of the system 100 did not switch to HDR, even though the initial output of the classifier 116 indicated HDR content.

Figure 3:
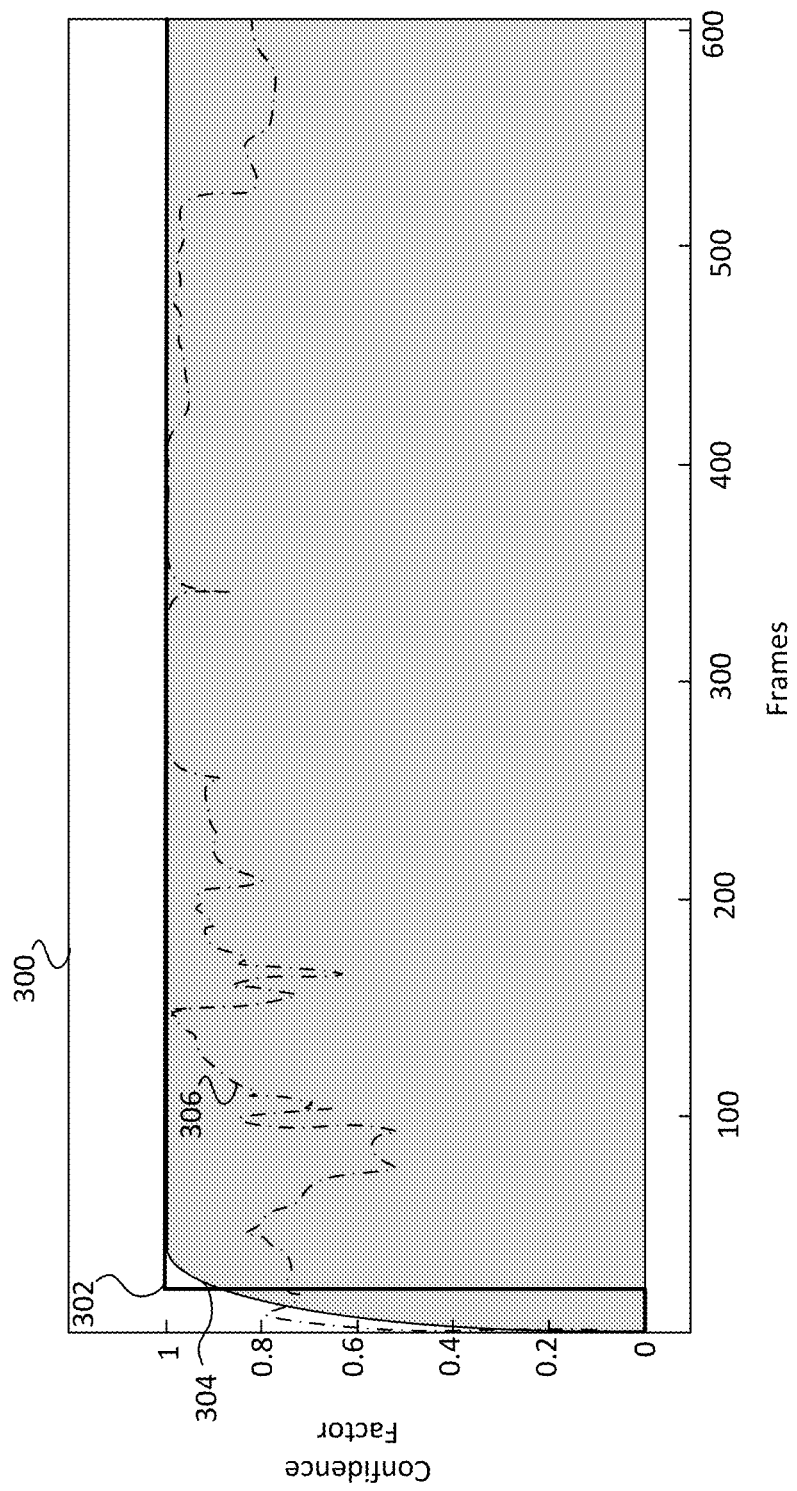
FIG. 3 is a plot illustrating an output of the system of FIG. 1 when an HDR video input is received.

FIG. 3 is a plot 300 illustrating the performance of the system 100 with a quadratic binary classifier 116 to detect HDR PQ (class 1) vs SDR (class 0) in accurately detecting a known 1080P HDR PQ 1000 nit grade input video clip. The horizontal axis of plot 300 represents the numbers of measured frames in the video clip, which corresponds to a one minute temporal length of the clip.

In FIG. 3, the binary result trace 302 produced by the system 100 initially starts at zero, but quickly changes to one after approximately eighteen frames, or approximately 3% of the clip. As can be seen in FIG. 3, the confidence factor trace 306 initially indicates that the video clip is most likely HDR. However, the system 100 is initially set to assume that the class is SDR upon startup and the filtered class 304 through the recursive detection filter 120 took time to settle before the binary result state was set to HDR. As soon as a threshold of 0.9 was crossed from the output of the recursive SDR detection filter 120, at approximately 18 frames, the binary output was changed to "1" to indicate an HDR class. Since the filtered class 304 never dropped below 0.5 after that point, the system 100 continued to output a binary result 302 of 1. This means that the system 100 accurately detected approximately 97% of the time that the video clip was HDR format.

Figure 4:
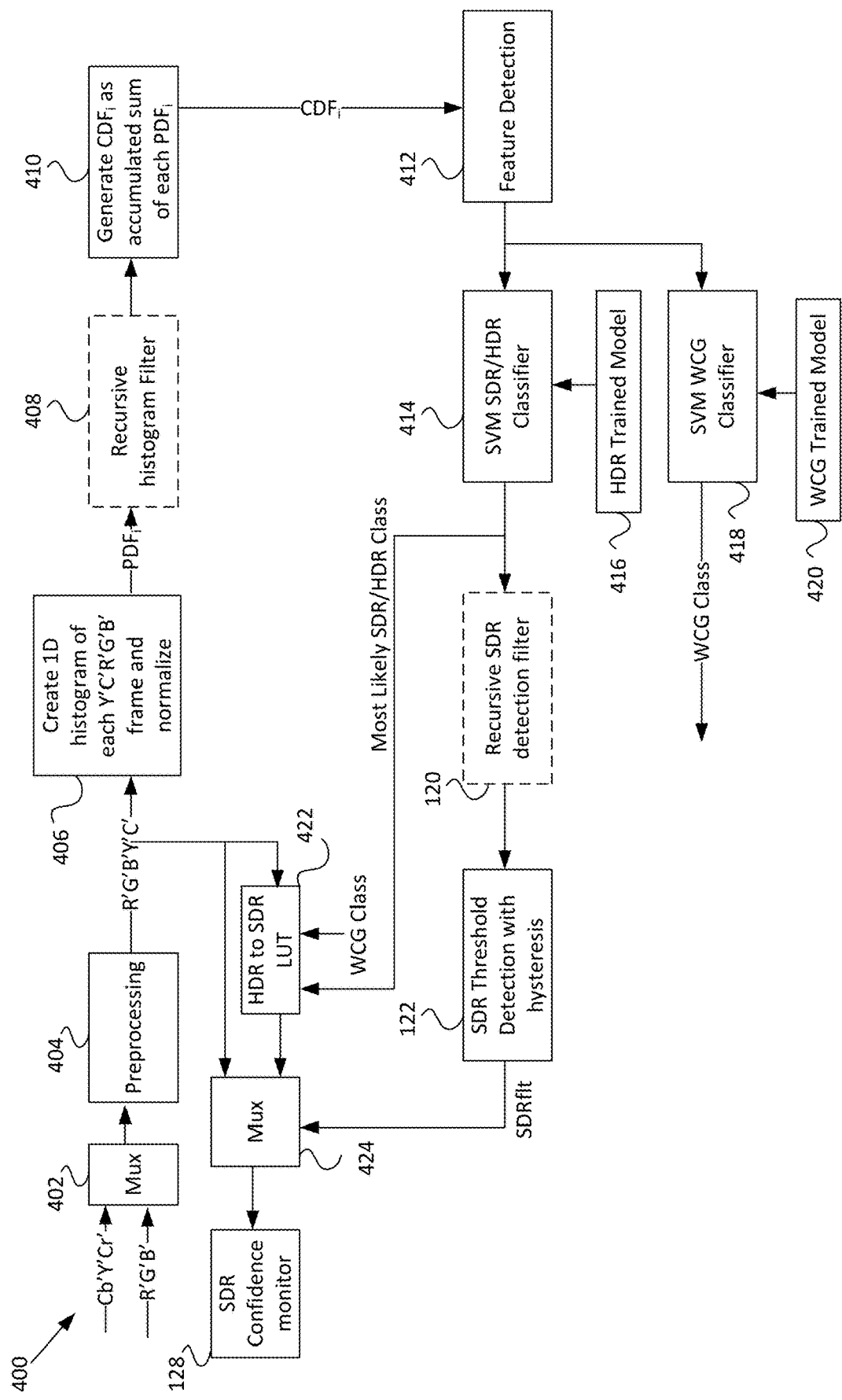
FIG. 4 is a block diagram of another high dynamic range video format detection system according to other embodiments of the disclosure.

FIG. 4 illustrates a block diagram of another example embodiment of a high dynamic range video format detection system 400. The system 400 includes the capability to detect both WCG and HDR encoding by also processing and classifying the R'G'B' input signals. A multiplexer 402 still selects the input signal. The preprocessing 404 can include deriving R'G'B inputs if a Cb'Y'Cr' signal is received and deriving Cb'Y'Cr' inputs if an R'G'B' signal is received using conversion matrices, as will be understood by one skilled in the art. Further, the C' component input may be derived from the Cb'Y'Cr' inputs. The C' component is the Chroma Magnitude without the phase, or hue, information, and may be derived according to $C'=(Cr^2+Cb^2)^{0.5}$.

The R'G'B'C'Y' inputs are forwarded to block 406 to create a one-dimensional, normalized histogram for each component for each frame. That is, block 406 will output five one-dimensional, normalized histogram for each frame. Similar to system 100, an optional recursive histogram filter 408 may be applied to each histogram output.

In block 410, a CDF is generated as an accumulated sum for each histogram output of block 406 (which may be optionally filtered at block 408). The feature detection block 412 performs the same as the feature detection block 114 of FIG. 1 for each CDF. A classifier 414 may be provided similar to the classifier 116 to classify whether the video input is an HDR or SDR format. The classifier 116 may classify any number of classes, such as SDR and HDR (a two class classifier), SDR, PQ HDR, and HLG HDR (a three class classifier), or any other formats that may need to be classified. Similar to FIG. 1, the output of the classifier 414 can be optionally further filtered through a recursive detection filter 120 and SDR threshold detection with hysteresis 122 applied, similar to system 100, and will not be discussed further with respect to system 400. The classifier 414 may also be trained with a model 416.

In the system 400, a WCG classifier 418 may also be provided to classify whether the frame contains WCG. The WCG classifier 418 may contain two classes in some embodiments, one class for BT.709 color and the other for BT.2020 color, or WCG. The WCG classifier 418 will also receive a trained model 420 similar to the classifier 414.

The output of the classifier 414 and the output of the classifier 418 can both be received at the look up table 422 or other process to convert the HDR content to SDR and the color space from BT.2020 to BT.709 based on the determined classes.

Similar to the system 100 in FIG. 1, a multiplier 424 can select either a pass through signal or a signal converted by the look up table 422 based on the output of the SDR threshold detection 122. The output of the multiplexer 424 is sent to the SDR confidence monitor 128, similar to system 100.

Figure 5:
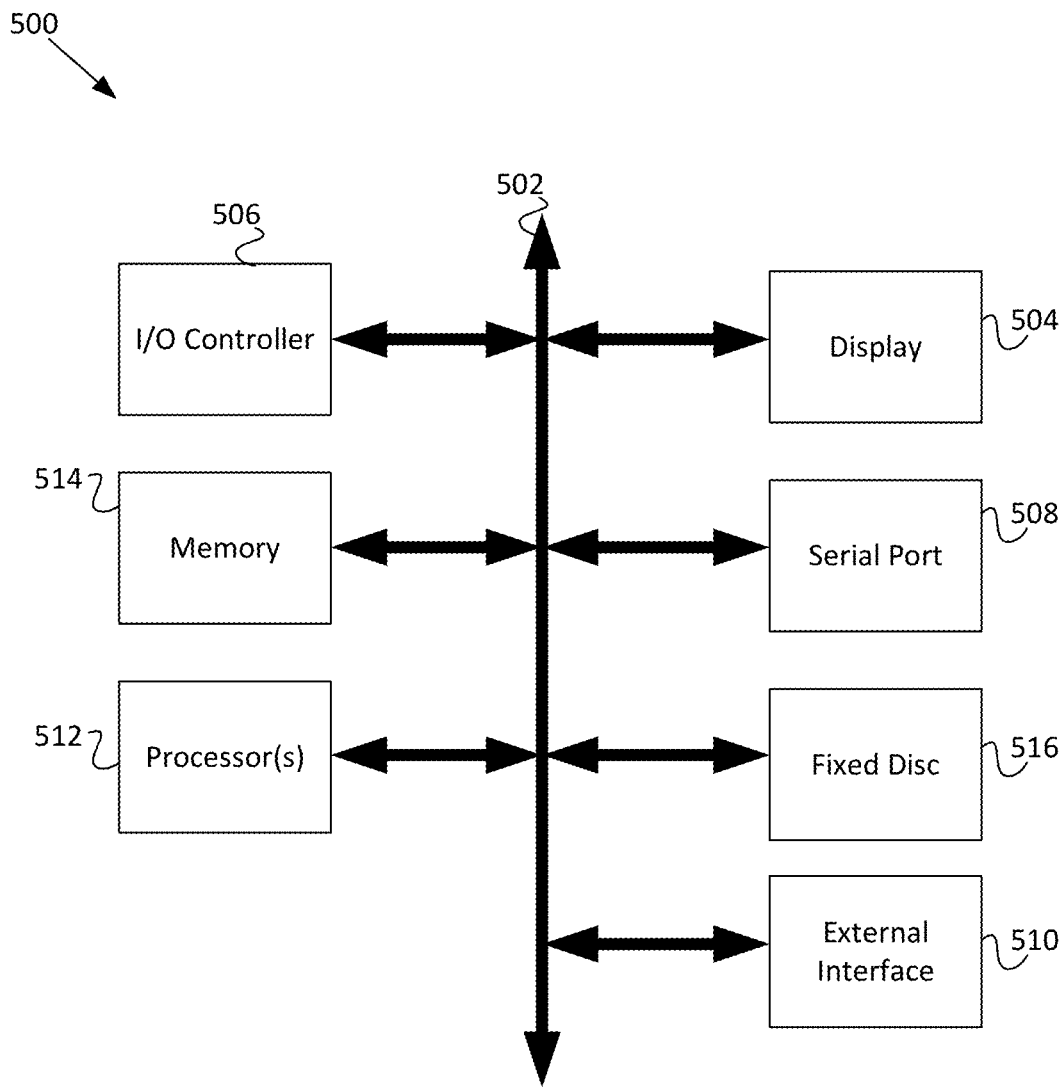
FIG. 5 is an example of a computer device or system used to implement high dynamic range video format detection system of either one of FIG. 1 or 4.

FIG. 5 is a diagram illustrating elements or components that may be present in a computer device or system configured to implement a method, process, function, or operation in accordance with an embodiment of the disclosure. As noted, in some embodiments, the system and methods described herein may be implemented in the form of an apparatus that includes a processing element and set of executable instructions. The executable instructions may be part of a software application and arranged into a software architecture. In general, an embodiment of the disclosure may be implemented using a set of software instructions that are designed to be executed by a suitably programmed processing element (such as a CPU, microprocessor, processor, controller, computing device, etc.). In a complex application or system such instructions are typically arranged into "modules" with each such module typically performing a specific task, process, function, or operation. The entire set of modules may be controlled or coordinated in their operation by an operating system (OS) or other form of organizational platform.

Each application module or sub-module may correspond to a particular function, method, process, or operation that is implemented by the module or sub-module. Such function, method, process, or operation may include those used to implement one or more aspects of the system and methods described herein.

The application modules and/or sub-modules may include any suitable computer-executable code or set of instructions (e.g., as would be executed by a suitably programmed processor, microprocessor, or CPU), such as computer-executable code corresponding to a programming language. For example, programming language source code may be compiled into computer-executable code. Alternatively, or in addition, the programming language may be an interpreted programming language such as a scripting language. The computer-executable code or set of instructions may be stored in (or on) any suitable non-transitory computer-readable medium. In general, with regards to the embodiments described herein, a non-transitory computer-readable medium may include almost any structure, technology or method apart from a transitory waveform or similar medium.

As described, the system, apparatus, methods, processes, functions, and/or operations for implementing an embodiment of the disclosure may be wholly or partially implemented in the form of a set of instructions executed by one or more programmed computer processors such as a central processing unit (CPU) or microprocessor. Such processors may be incorporated in an apparatus, server, client or other computing or data processing device operated by, or in communication with, other components of the system. As an example, FIG. 5 is a diagram illustrating elements or components that may be present in a computer device or system 500 configured to implement a method, process, function, or operation in accordance with an embodiment of the disclosure. The subsystems shown in FIG. 5 are interconnected via a system bus 502. Subsystems can include a display 504 and peripherals and input/output (I/O) devices, which couple to an I/O controller 506, can be connected to the computer system by any number of means known in the art, such as a serial port 508. For example, the serial port 508 or an external interface 510 can be utilized to connect the computer device 500 to further devices and/or systems not shown in FIG. 5 including a wide area network such as the Internet, a mouse input device, and/or a scanner. The interconnection via the system bus 502 allows one or more processors 512 to communicate with each subsystem and to control the execution of instructions that may be stored in a system memory 514 and/or the fixed disk 516, as well as the exchange of information between subsystems. The system memory 514 and/or the fixed disk 516 may embody a tangible computer-readable medium.

Any of the software components, processes or functions described in this application may be implemented as software code to be executed by a processor using any suitable computer language such as, for example, Java, JavaScript, C++ or Perl using, for example, conventional or object-oriented techniques. The software code may be stored as a series of instructions, or commands in (or on) a non-transitory computer-readable medium, such as a random-access memory (RAM), a read only memory (ROM), a magnetic medium such as a hard-drive or a floppy disk, or an optical medium such as a CD-ROM. In this context, a non-transitory computer-readable medium is almost any medium suitable for the storage of data or an instruction set, aside from a transitory waveform. Any such computer readable medium may reside on or within a single computational apparatus, and may be present on or within different computational apparatuses within a system or network.

According to one example implementation, the term processing element or processor, as used herein, may be a central processing unit (CPU), or conceptualized as a CPU (such as a virtual machine). In this example implementation, the CPU or a device in which the CPU is incorporated may be coupled, connected, and/or in communication with one or more peripheral devices, such as display.

The non-transitory computer-readable storage medium referred to herein may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, synchronous dynamic random access memory (SDRAM), or similar devices or other forms of memories based on similar technologies. As mentioned, with regards to the embodiments described herein, a non-transitory computer-readable medium may include almost any structure, technology or method apart from a transitory waveform or similar medium.

Certain implementations of the disclosed technology are described herein with reference to block diagrams of systems, and/or to flowcharts or flow diagrams of functions, operations, processes, or methods. It will be understood that one or more blocks of the block diagrams, or one or more stages or steps of the flowcharts or flow diagrams, and combinations of blocks in the block diagrams and stages or steps of the flowcharts or flow diagrams, respectively, can be implemented by computer-executable program instructions. Note that in some embodiments, one or more of the blocks, or stages or steps may not necessarily need to be performed in the order presented, or may not necessarily need to be performed at all.

These computer-executable program instructions may be loaded onto a general-purpose computer, a special purpose computer, a processor, or other programmable data processing apparatus to produce a specific example of a machine, such that the instructions that are executed by the computer, processor, or other programmable data processing apparatus create means for implementing one or more of the functions, operations, processes, or methods described herein. These computer program instructions may also be stored in a computer-readable memory that can direct a computer or other programmable data processing apparatus to function in a specific manner, such that the instructions stored in the computer-readable memory produce an article of manufacture including instruction means that implement one or more of the functions, operations, processes, or methods described herein.

Aspects of the disclosure may operate on particularly created hardware, firmware, digital signal processors, or on a specially programmed computer including a processor operating according to programmed instructions. The terms controller or processor as used herein are intended to include microprocessors, microcomputers, Application Specific Integrated Circuits (ASICs), and dedicated hardware controllers. One or more aspects of the disclosure may be embodied in computer-usable data and computer-executable instructions, such as in one or more program modules, executed by one or more computers, or other devices. Generally, program modules include routines, programs, objects, components, data structures, etc. that perform particular tasks or implement particular abstract data types when executed by a processor in a computer or other device. The computer executable instructions may be stored on a computer readable storage medium such as a hard disk, optical disk, removable storage media, solid state memory, Random Access Memory (RAM), etc. As will be appreciated by one of skill in the art, the functionality of the program modules may be combined or distributed as desired in various aspects. In addition, the functionality may be embodied in whole or in part in firmware or hardware equivalents such as integrated circuits, FPGA, and the like. Particular data structures may be used to more effectively implement one or more aspects of the disclosure, and such data structures are contemplated within the scope of computer executable instructions and computer-usable data described herein.

The disclosed aspects may be implemented, in some cases, in hardware, firmware, software, or any combination thereof. The disclosed aspects may also be implemented as instructions carried by or stored on one or more or computer-readable storage media, which may be read and executed by one or more processors. Such instructions may be referred to as a computer program product. Computer-readable media, as discussed herein, means any media that can be accessed by a computing device. By way of example, and not limitation, computer-readable media may comprise computer storage media and communication media.

Computer storage media means any medium that can be used to store computer-readable information. By way of example, and not limitation, computer storage media may include RAM, ROM, Electrically Erasable Programmable Read-Only Memory (EEPROM), flash memory or other memory technology, Compact Disc Read Only Memory (CD-ROM), Digital Video Disc (DVD), or other optical disk storage, magnetic cassettes, magnetic tape, magnetic disk storage or other magnetic storage devices, and any other volatile or nonvolatile, removable or non-removable media implemented in any technology. Computer storage media excludes signals per se and transitory forms of signal transmission.

Communication media means any media that can be used for the communication of computer-readable information. By way of example, and not limitation, communication media may include coaxial cables, fiber-optic cables, air, or any other media suitable for the communication of electrical, optical, Radio Frequency (RF), infrared, acoustic or other types of signals.

EXAMPLES

Illustrative examples of the technologies disclosed herein are provided below. An embodiment of the technologies may include any one or more, and any combination of, the examples described below.

Example 1 is a video format detector, comprising a video input structured to receive a video signal in a one of a plurality of possible video formats; a cumulative distribution function generator structured to generate a cumulative distribution function curve from a component of the video signal; a feature detector structured to generate one or more feature vectors from the cumulative distribution function curve; and a video classifier structured to accept the one or more feature vectors from the feature detector and to generate a prediction of the video format in which the video signal was produced based, at least in part, on the received feature vectors.

Example 2 is the video format detector of example 1 in which the video classifier is structured to generate the prediction of the video format based, at least in part, on a model generated for the video classifier.

Example 3 is the video format detector of either one of examples 1 or 2 in which the classifier is support vector machine.

Example 4 is the video format detector any one of examples 1 through 3 further comprising a recursive filter configured to filter the prediction of the video format from the video classifier and output a filtered prediction of the video format; and a threshold detector configured to receive the filtered prediction of the video format and output a detected video format based on whether the filtered prediction of the video format violates one or more thresholds.

Example 5 is the video format detector of example 4 further comprising a multiplexer configured to receive the detected video format from the threshold detector and select an input of the multiplexer based on the detected video format.

Example 6 is the video format detector of example 5, further comprising a converter configured to receive the prediction of the video format from the video classifier and convert the component of the signal to a converted component of the signal, wherein the multiplexer includes a first input to receive the component of the signal and a second input to receive the converted component of the signal.

Example 7 is the video format detector of example 6, wherein the component of the signal is a luminance component of the video signal, a color space component of the video signal, or both a luminance component of the video signal and a color space component of the video signal.

Example 8 is the video format detector of any one of examples 1, 2, and 4 through 7, wherein the video classifier is a Bayesian device, a decision tree, or a convolutional neural network.

Example 9 is the video format detector of any one of examples 1 through 8 further comprising a color space classifier structured to accept the one or more feature vectors from the feature detector and to generate a prediction of the color space in which the video signal was produced based, at least in part, on the received feature vectors.

Example 10 is a method for detecting a video format of an input video, comprising receiving a video signal in one of a plurality of possible video formats; generating a cumulative distribution function curve from a component of the video signal; generating one or more feature vectors from the cumulative distribution function curve; and generating, by a video classifier, a prediction of the video format in which the video signal was produced based, at least in part, on the one or more feature vectors.

Example 11 is the method of example 10, wherein generating the prediction of the video format includes generating the prediction based, at least in part, on a model generated for the video classifier.

Example 12 is the method of either one of examples 10 or 11, further comprising filtering the prediction of the video format from the video classifier and output a filtered prediction of the video format; determining whether the filtered prediction of the video format violates a threshold; and outputting a detected video format based on whether the filtered prediction of the video format violates the threshold.

Example 13 is the method of example 12 further comprising receiving the detected video format from the threshold detector at a multiplexer and selecting an input of the multiplexer based on the detected video format.

Example 14 is the method of example 13, further comprising converting the component of the signal to a converted component of the signal, wherein the multiplexer includes a first input to receive the component of the signal and a second input to receive the converted component of the signal Example 15 is the method of example 14, wherein the component of the signal is a luminance component of the video signal, a color space component of the video signal, or both a luminance component of the video signal and a color space component of the video signal.

Example 16 is the method of any one of examples 10 through 15, wherein the video classifier is a support vector machine, a Bayesian device, a decision tree, or a convolutional neural network.

Example 17 is the method of any one of examples 10 through 16, further comprising generating a prediction of the color space in which the video signal was produced based, at least in part, on the one or more feature vectors.

Example 18 is one or more computer-readable storage media comprising instructions, which, when executed by one or more processors of a video format detector, cause the video format detector to generate a cumulative distribution function curve from a component of a received video signal in one of a plurality of possible video formats; produce one or more feature vectors from the cumulative distribution function curve; and determine, by a video classifier, a prediction of the video format in which the video signal was produced based, at least in part, on the one or more feature vectors.

Example 19 is the one or more computer-readable storage media of example 18, further comprising instructions to cause the video format detector to filter the prediction of the video format from the video classifier and output a filtered prediction of the video format; determine whether the filtered prediction of the video format violates a threshold; and output a value indicating the video format based on whether the filtered prediction of the video format violates the threshold.

Example 20 is the one or more computer-readable storage media of example 18, further comprising instructions to cause the video format detector to generate a prediction of the color space in which the video signal was produced based, at least in part, on the one or more feature vectors.

The previously described versions of the disclosed subject matter have many advantages that were either described or would be apparent to a person of ordinary skill. Even so, these advantages or features are not required in all versions of the disclosed apparatus, systems, or methods.

Additionally, this written description makes reference to particular features. It is to be understood that the disclosure in this specification includes all possible combinations of those particular features. Where a particular feature is disclosed in the context of a particular aspect or example, that feature can also be used, to the extent possible, in the context of other aspects and examples.

Also, when reference is made in this application to a method having two or more defined steps or operations, the defined steps or operations can be carried out in any order or simultaneously, unless the context excludes those possibilities.

Although specific examples of the invention have been illustrated and described for purposes of illustration, it will be understood that various modifications may be made without departing from the spirit and scope of the invention. Accordingly, the invention should not be limited except as by the appended claims.

I claim:

1. A video format detector, comprising:
   a video input structured to receive a video signal in a one of a plurality of possible video formats;
   a cumulative distribution function generator structured to generate a cumulative distribution function curve from a component of the video signal;
   a feature detector structured to generate one or more feature vectors from the cumulative distribution function curve;
   a video classifier structured to accept the one or more feature vectors from the feature detector and to generate a prediction of the video format in which the video signal was produced based, at least in part, on the received feature vectors;
   a recursive filter configured to filter the prediction of the video format from the video classifier and output a filtered prediction of the video format; and
   a threshold detector configured to receive the filtered prediction of the video format and output a detected video format based on whether the filtered prediction of the video format violates one or more thresholds.

2. The video format detector according to claim 1 further comprising a multiplexer configured to receive the detected video format from the threshold detector and select an input of the multiplexer based on the detected video format.

3. The video format detector according to claim 2, further comprising a converter configured to receive the prediction of the video format from the video classifier and convert the component of the signal to a converted component of the signal, wherein the multiplexer includes a first input to receive the component of the signal and a second input to receive the converted component of the signal.

4. The video format detector according to claim 3, wherein the component of the signal is a luminance component of the video signal, a color space component of the video signal, or both a luminance component of the video signal and a color space component of the video signal.

5. The video format detector according to claim 1, wherein the video classifier is a Bayesian device, a decision tree, or a convolutional neural network.

6. The video format detector according to claim 1, further comprising a color space classifier structured to accept the one or more feature vectors from the feature detector and to generate a prediction of the color space in which the video signal was produced based, at least in part, on the received feature vectors.

7. A method for detecting a video format of an input video, comprising:
   receiving a video signal in one of a plurality of possible video formats;
   generating a cumulative distribution function curve from a component of the video signal;
   generating one or more feature vectors from the cumulative distribution function curve;
   generating, by a video classifier, a prediction of the video format in which the video signal was produced based, at least in part, on the one or more feature vectors;
   filtering the prediction of the video format from the video classifier and output a filtered prediction of the video format;
   determining whether the filtered prediction of the video format violates a threshold; and
   outputting a detected video format based on whether the filtered prediction of the video format violates the threshold.

8. The method according to claim 7 further comprising receiving the detected video format from the threshold detector at a multiplexer and selecting an input of the multiplexer based on the detected video format.

9. The method according to claim 8, further comprising converting the component of the signal to a converted component of the signal, wherein the multiplexer includes a first input to receive the component of the signal and a second input to receive the converted component of the signal.

10. The method according to claim 9, wherein the component of the signal is a luminance component of the video signal, a color space component of the video signal, or both a luminance component of the video signal and a color space component of the video signal.

11. The method according to claim 7, wherein the video classifier is a support vector machine, a Bayesian device, a decision tree, or a convolutional neural network.

12. The method according to claim 7, further comprising generating a prediction of the color space in which the video signal was produced based, at least in part, on the one or more feature vectors.

13. One or more computer-readable storage media comprising instructions, which, when executed by one or more processors of a video format detector, cause the video format detector to:
   generate a cumulative distribution function curve from a component of a received video signal in one of a plurality of possible video formats;
   produce one or more feature vectors from the cumulative distribution function curve;
   determine, by a video classifier, a prediction of the video format in which the video signal was produced based, at least in part, on the one or more feature vectors;
   filter the prediction of the video format from the video classifier and output a filtered prediction of the video format;
   determine whether the filtered prediction of the video format violates a threshold; and
   output a value indicating the video format based on whether the filtered prediction of the video format violates the threshold.

14. The one or more computer-readable storage media according to claim 13, further comprising instructions to cause the video format detector to generate a prediction of the color space in which the video signal was produced based, at least in part, on the one or more feature vectors.

* * * * *